_United States Patent Office_

2,759,903
Patented Aug. 21, 1956

2,759,903
RESINOUS FUNGICIDE

Aaron Epstein and Marianne Falck, Atlanta, Ga.; said Falck assignor to said Epstein No Drawing. Application April 22, 1952,
Serial No. 283,774

16 Claims. (Cl. 260—29.3)

This invention relates to improved resinous fungicide products applicable to various materials for the fungicidal protection thereof, particularly textile, to their method of preparation and to protection of various organic fibrous products such as textile therewith.

More particularly the invention relates to a new complex resinous reaction product formed by reaction of a novolak phenol-aldehyde resin in the fused state with a dehydrochlorinatable polychlorinated carbocyclic hydrocarbon which may contain non-polar substituents in the ring such as lower alkyl or alkoxy groups of 1 to 3 carbon atoms and containing at least 3 chlorine atoms distributed either in the ring or on the hydrocarbon side chain; or such fused complex reaction product further reacted with a chlorinated phenol or chlorinated cresol having 1 to 5 chlorine atoms as a more fungicidally active modification.

The complex resinous products hereof are stable, highly active fungicides, forming more or less stable emulsions or suspensions in aqueous alkaline solutions. They may be readily applied to textile in a manner to resist leaching while maintaining their fungicidal potency over long periods of time. They are colorless as applied to textile, do not affect colors applied, nor are they affected by the dyes present in the textile.

These fungicidally active complex resins are improved over the typical fungicides heretofore proposed in the art such as copper naphthenate, chlorinated phenols, salicylanilide with which great difficulty is encountered in adhering the same to textile in a fungicidally active manner to resist leaching, or the compound is objectionably colored to preclude its application to textile in an economic manner for the practical fungicidal protection thereof.

The novolak resins preferably used herein are the low melting permanently fusible phenol-aldehyde resins which, for purposes of reducing the odor when this is objectionable, may be substantially free of free phenol. The novolak resins as known are linear thermoplastic polymers formed by the acid condensation of a phenol and an aldehyde. The phenol is preferably a monohydric phenol such as phenol, cresol, or xylenol. The aldehyde is usually one of the lower aldehydes such as formaldehyde or formaldehyde releasing substances such as paraformaldehyde or hexamethylene tetramine. As is well known in the art, novolak resins are phenol aldehyde condensation products in which the phenol is present in a molar excess with respect to the aldehyde whereby the condensation product formed is permanently fusible.

Typical dehydrochlorinatable polychlorinated carbocyclic compounds used herein for reaction with novolak to form the complex are DDT (dichloro diphenyl trichloro ethane), benzene hexachloride (1,2,3,4,5,6 hexachloro cyclohexane), methoxy chlor [di (paramethoxy phenyl) trichloro ethane], chlordane (1,2,4,5,6,7,8,8-octachloro 4,-7-methane, 3a,4,7,7a-tetrahydro indane), or toxaphene (which is a polychlorinated bicyclic terpene having the empirical formula $C_{10}H_{10}Cl_8$ a yellow waxy solid melting over a broad range of 65 to 90° C.). These compounds before reaction to form the complex are substantially fungicidally inactive per se and have the chlorine attached in a manner to be partially evolved by heating as HCl. Such compounds react exothermically with fusible novolak-phenol-aldehyde resins to evolve some chlorine as hydrogen chloride forming therewith a complex reaction product. This complex exhibits substantial fungicidal activity.

It is further found that the fungicidal activity of the fusible binary resinous complex may be substantially increased by addition to and reaction with the binary complex above, such active fungicides as the chlorinated phenols or cresols having 1 to 5 chlorine atoms. These chlorinated phenols or cresols as parachlorophenol, monochlorinated cresols, dichlorinated phenol, dichloro cresol, trichloro phenol, trichloro cresol, tetrachloro phenol, tetrachloro cresol, and pentachloro phenol, known in the art to be fungicidally active and used herein to form a resinous complex are not directly reactable with novolak resins. When a fused novolak alone has added thereto any of these chlorinated phenols or chlorinated cresols to form a homogeneous melt, no reaction takes place and such homogeneous fused mixture if applied to textile, causes the textile temporarily to become fungicidally active, but the textile quickly has this fungicidal activity leached out. We have found that further addition of such chlorinated phenols and cresols to the complex above described of novolak reacted by fusion with dehydrochlorinatable polychlorinated hydrocarbon causes another complex reaction product to be formed wherein both types of chlorinated compound enter into the reaction to form a fusible resinous complex of substantially great fungicidal activity which is unleachable after repeated washings of the textile treated therewith.

Proceeding according to the present invention, a permanently fusible phenol-aldehyde resin, typically novolak, preferably melting in the range of 65 to 95° C. is first heated to a substantially high temperature to form a hot melt thereof, such as in the range of 130 to 190° C. and preferably in the range of 150 to 180° C. A quantity of dehydrochlorinatable polychlorinated carbocyclic compound such as DDT, benzene hexachloride, methoxy chlor, chlordane, toxaphene, etc. is then added to the fused resin with continuous stirring. Reaction begins immediately with foaming and considerable evolution of hydrogen chloride and the resin turns to a dark red color and the melt becomes thicker. The reaction time is short usually depending upon the quantity of chlorinated compound present. In general the reaction time for forming the binary complex is from 5 to 15 minutes but further heating after admixture may be applied for 5 to 20 minutes. The reaction goes most rapidly with larger proportions of dehydrochlorinatable compound and at the higher end of the temperature range and more slowly at the lower end thereof and the time of reaction accordingly will be varied. At the end of the reaction period the fused product is merely poured into pans and allowed to cool naturally to a solid.

To form the ternary complex, both types of chlorine compounds in desired proportions may be added to the fused novolak resin in this temperature range of 130 to 190° C. with continuous stirring to obtain a homogeneous melt and with a reaction time variable from 5 to 30 minutes with further heating after mixture for a period of up to 20 minutes, again depending upon the proportions and the temperature at which the melt is maintained.

It is preferred, however, in forming the ternary complex to first add the dehydrochlorinatable compound allowing it to react as above described to form the binary complex and, while still maintaining the complex in the fused state in this temperature range, to then add the chlorinated phenolic compound. Similarly, during the reaction to form the ternary complex a substantial color change takes place from a normal colorless light amber to a dark red with substantial thickening of the fluid and considerable evolution of gases containing hydrogen chloride, some heat being evolved exothermically. The product highly active as a fungicide is a fusible resinous solid. It sets to a brittle mass upon cooling which is readily powdered and may be readily dissolved in dilute aqueous alkali.

In these reactions considerable variation of proportions of the dehydrochlorinatable compound is possible ranging from 1 to 45%, based on the weight of the novolak; which will react with the fused resin under the conditions stated, but the practical useful range is 10 to 30%. The quantity of chlorinated phenol is generally approximately the same as the dehydrochlorinatable compound but may be varied in the ratio of 4:1 to 1:2 thereto. In general, we prefer to use about three parts of the chlorinated phenolic compound to about two parts of the dehydrochlorinatible compound.

As indicated above the reaction time varies with the temperature and the proportions. Where larger proportions of a dehydrochlorinatable compound are used the reaction goes much more rapidly particularly if the temperature is maintained at the upper end of the range, i. e. 180° C. Under such conditions 5 to 15 minutes of reaction time is sufficient, and little if any additional heating, i. e. no more than about 5 minutes would be applied after the components have been homogeneously mixed. But where the temperature is lower or the proportions are lower the fused mixture would be heated from 5 to 25 minutes after mixture.

A preferred procedure is to first rapidly heat the novolak resin in a kettle over a period of 3 to 10 minutes to the higher end of the temperature range from 150 to 190° C. to thoroughly fluidize the same, and then cool the melt somewhat to the lower or intermediate range of 130 to 160° C., then the dehydrochlorinatible compound is slowly added to the resin with stirring and finally, particularly where proportions are intermediate or low, increasing the temperature or continuing the heating for a short period up to about 25 minutes after addition. Where both compounds are used it is preferred first to add the dehydrochlorinatable compound as stated and then the chlorinated phenolic compound, the latter being added at the highest temperature of the melt with continuous stirring with or without further heating after homogeneous addition depending on the proportions.

These complexes, similar to novolak resins, are brittle readily fusible solids, forming more or less stable emulsions or suspensions in dilute aqueous alkali. The complex is readily fixed to textile as an active unleachable fungicide for protection thereof such as by dipping of the textile in an aqueous alkaline solution thereof, and then setting the same on the textile with such well known fixatives as dilute acetic acid (2%) or acid aluminum acetate, i. e. aluminum acetate with acetic acid added. This permanently fusible first stage reaction product for textile treatment is usually dissolved in dilute alkali such as a .5 to 3% aqueous alkali solution. The resin is dissolved in proportions of about 1 to 5%, preferably about 2 to 3% of the caustic soda solution.

Except for the chlorinated phenols, which have poor leach resistance, none of the individual components used in the formation of these complexes are useful alone as fungicides for the protection of textile. The chlorinated carbocyclic compounds generally having utility as insecticides have substantially no fungicidal effect. The chlorinated phenol, while having a fungicidal activity, does not react with novolak in the absence of the dehydrochlorinatable compound. For example, a fusion product of novolak with the chlorinated phenolic compound alone is readily leached from the textile to which it is applied and quickly loses its activity. A fusion product of the two types of chlorinated compounds without the resin is not an interacted complex and such product applied to textile would similarly be leachable. It is only in the presence of dehydrochlorinatable compounds that a complex may be made with the novolak resin in which both components are reacted to a fungicidally active binary complex; or in the further presence of a chlorinated phenolic compound wherein a ternary complex is formed of much higher fungicidal activity, both complexes being unleachable from textile treated therewith.

Thus, for application to textile or similar organic fibrous products, a dilute aqueous alkali solution having the complex dissolved therein in any desired quantity may further have dissolved or dispersed therein wetting agents, sizes, water repellent agents, etc., and the textile is dipped therein to effect impregnation thereof. Thereafter the excess fluid is squeezed out of the textile and the fungicide set by applying a further dip or treatment with dilute slightly acidic aluminum acetate solution and the textile is finally dried.

For fungicidal protection of other products the powdered resin may be applied directly as a dusting powder for the protection of plants, etc., or such products as may be protected by spraying the dilute alkaline solution of the complex thereon. Alternatively, the resinous complex may be applied by various methods known in the art in various types of solution or suspension in water or organic solvents, or the resin may be directly incorporated in known coating compositions.

EXAMPLE 1

50 lbs. of novolak resin having a melting point of 65° C. are melted in a stainless steel kettle and heated slowly to 160° C. with continuous stirring over the entire operation. The melt is allowed to cool to 140° C. and there is then gradually added 15 lbs. of DDT while maintaining the temperature at about 140° C. plus or minus 10° C., over a period of approximately 10 minutes. The mixture is then slowly heated for about 5 minutes to raise the temperature to approximately 175° C. plus or minus 15° C. and maintained at that point for about 20 minutes. The ingredients are slowly stirred during the entire operation and when the heating period is completed the molten product which has taken on a deep red color is poured into a pan and allowed to cool and harden into a brittle mass. The cold brittle product is then powdered to a dust for use as a fungicide.

EXAMPLE 2

50 lbs. of novolak resin melting at approximately 95° C. are melted in a stainless steel kettle and the melt is slowly heated to 160° C. Thereafter, the melt is allowed to cool to 140° C., the heating, cooling and subsequent operations being effected while the resin is constantly stirred. There is then added slowly over a period of 10 minutes 15 lbs. of commercial benzene hexachloride (usually containing about 12% of the gamma isomer) while maintaining the temperature at 140° plus or minus 10° C. Then slowly over a period of 5 minutes the temperature is gradually raised to 175° plus or minus 15° C. and maintained at such temperature for approximately 10 minutes. The product is then poured into a pan and allowed to cool and harden at room temperature. The product is then ground into a powder. It may be dissolved in dilute alkali solution such as 1% aqueous solution of alkali and applied to the textile. The product is fungicidally active and unleachable after setting in the textile with acid aluminum acetate.

EXAMPLE 3

50 lbs. of novolak resin melting at approximately 95° C. are melted in a stainless steel kettle and slowly heated to 160° C. with constant stirring. The melt is then allowed to cool to 140° C. and there is then added slowly and over a period of 3 minutes 5 lbs. of DDT while maintaining the temperature at 140° C. plus or minus 10° C. The temperature is then raised slowly over a period of 5 minutes to a temperature of 175° C. plus or minus 15° C. and held at that point for about 10 minutes. There is then gradually added 5 lbs. of pentachloro phenol over a period of 3 minutes while maintaining the temperature at 175° C. plus or minus 15° C. for about 7 minutes longer to make the total time at this high temperature about 20 minutes. The entire reaction is carried out with constant stirring. The molten product is poured into a pan and allowed to cool and harden naturally at room temperature. During the reaction there is considerable evolution of gases containing hydrochloric acid and the product obtained is a dark red brittle mass which is pulverized to a powder for use as a fungicide.

EXAMPLE 4
Treatment of textile 2 lbs. of the pulverized fusion product of any of the examples given above and 1 lb. of sodium hydroxide are added to 100 lbs. of water in a kettle and the water briefly brought to a boil to convert all of the fungicide powder to a fine suspension or solution therein. To this solution there is then added 6.7 lbs. of sodium stearate chip soap, 9.6 lbs. of paraffin wax, and the solution again heated almost to boiling until all of the materials are dissolved or emulsified with stirring. The fabric to be treated, for example cotton duck, is dipped into this solution, the fabric squeezed to remove excess liquid and while wet is dipped into a second bath of 7° Baumé aluminum acetate solution in water containing 2% of added acetic acid. The excess liquid is again squeezed out and the cloth is then dried to give the fabric a water resistant finish.

EXAMPLE 5

In a treatment using the resinous complex obtained according to Example 3, small rolls of the treated cloth obtained as described in Example 4 were placed upon mycelium mats of Chaetomium globsum growing on organic media. The cultures were then incubated for 2 weeks at a temperature of 27° C., under sterile conditions. The treated cloth at the end of this period showed no spores or growth of the fungus.

EXAMPLE 6

In a second procedural test flat pieces of the treated cloth according to Examples 3 and 4 were placed on inorganic media and were inoculated with the spores of Chaetomium globsum and again incubated for 2 weeks at 27° C. and no spores were found to germinate on the treated sample as compared to a prolific growth of the fungus on an untreated control piece of similar fabric.

Certain modifications will occur to those skilled in the art. Thus the complex may be blended with other known treating agents for improving textile, paper or similar fibrous products to improve the commercial utility. Similarly where applied for the fungicidal protection of other substances the compostiion may be blended with various carrier powders or liquids, etc.

We claim:

1. A fungicidally active fusible resinous product formed by reacting a polychlorinated carbocyclic compound containing at least 3 chlorine atoms, selected from the group consisting of polychlorinated carbocyclic hydrocarbons and polychlorinated carbocyclic hydrocarbon alkoxy ethers, said compound containing substituted chlorine which is evolved as hydrogen chloride by heating and a permanently fusible phenolaldehyde resin, a major proportion of said resin being heated with a minor proportion of said polychlorinated compound at a temperature exceeding the melting point of said resin and with the evolution of hydrogen chloride from said compound.

2. A fungicidally active fusible resinous product as claimed in claim 1 containing reacted therewith a chlorinated monohydric phenolic compound selected from the group consisting of phenol and cresol each having 1 to 5 chlorine atoms substituted in the ring.

3. A fungicidally active product as claimed in claim 2 wherein said polychlorinated carbocyclic compound is di(paramethoxy phenyl) trichloro ethane and said chlorine substituted phenol is pentachloro phenol.

4. The fungicidally active fusion product of dichloro diphenyl trichloro ethane, and a larger proportion of a permanently fusible phenol-aldehyde resin, said product being formed at a temperature exceeding the melting point of said resin during which hydrogen chloride is evolved from said dichloro diphenyl trichloro ethane and being reacted with phenol having 1 to 5 chlorine atoms substituted in the ring.

5. The fungicidally active fusion product of benzene hexachloride and a larger proportion of a permanently fusible phenol-aldehyde resin, said product being formed at a temperature exceeding the melting point of said resin during which hydrogen chloride is evolved from said hexachloride, and being reacted with phenol having 1 to 5 chlorine atoms substituted in the ring.

6. A product as in claim 5 wherein said chlorine substituted phenol is pentachlorophenol.

7. A fungicidally active fusion product of dichloro diphenyl trichloro ethane and a permanently fusible phenol-aldehyde resin, said resin being present in major proportion, and being formed at a temperature exceeding the melting point of said resin during which hydrogen chloride is evolved from said dichloro diphenyl trichloro ethane.

8. The fungicidally active fusion product of dichloro diphenyl trichloro ethane and a permanently fusible phenol-aldehyde resin, said resin being present in major proportion, said product being formed at a temperature exceeding the melting point of said resin during which hydrogen chloride is evolved from said dichloro diphenyl trichloro ethane and being reacted with pentachlorophenol.

9. The fungicidally active fusion product of benzene hexachloride and a permanently fusible phenol-aldehyde resin, said resin being present in major proportion, said product being formed at a temperature exceeding the melting point of said resin, said hexachloride evolving hydrogen chloride by heating with said resin.

10. The fungicidally active fusion product of benzene hexachloride and a permanently fusible phenol-aldehyde resin, said resin being present in major proportion, said product being formed at a temperature exceeding the melting point of said resin, said hexachloride evolving hydrogen chloride by heating with said resin and being reacted with pentachlorophenol.

11. The method of forming a fungicidally active fusible resinous product comprising heating a readily fusible phenol-aldehyde resin at a temperature in the range of 130 to 190° C. and which is above the melting point of said resin, homogeneously mixing therewith a lesser quantity of a polychlorinated carbocyclic compound containing at least 3 chlorine atoms, selected from the group consisting of polychlorinated carbocyclic hydrocarbons and polychlorinated carbocyclic hydrocarbon alkoxy ethers, said compound containing substituted chlorine which is evolved as hydrogen chloride by heating said compound, and cooling the melt.

12. The method of forming a fungicidally active fusible resinous product comprising heating a readily fusible phenaldehyde resin at a temperature in the range of 130 to 190° C. which is above the melting point of said resin, homogeneously mixing therewith in lesser quantities a polychlorinated carbocyclic compound containing at least 3 chlorine atoms, selected from the group consisting of polychlorinated carbocyclic hydrocarbons and polychlorinated carbocyclic hydrocarbon alkoxy ethers, said compound containing substituted chlorine which is evolved as hydrogen chloride by heating said compound with said resin, adding thereto a compound selected from the group consisting of phenol and cresol each having 1 to 5 chlorine atoms substituted in the ring and cooling the melt.

13. The method of fungicidally protecting organic fibrous products comprising impregnating the fiber with a fusible fusion product of a polychlorinated carbocyclic compound containing at least 3 chlorine atoms, selected from the group consisting of polychlorinated carbocyclic hydrocarbons and polychlorinated carbocyclic hydrocarbon alkoxy ethers, with a larger quantity of a permanently fusible phenol-aldehyde resin, said compound containing substituted chlorine which is evolved as hydrogen chloride by heating said compound with said resin and said product being formed at a temperature exceeding the melting point of said resin.

14. The method as claimed in claim 13 wherein said fusion product is reacted in the molten state with phenol having 1 to 5 chlorine atoms substituted in the ring prior to impregnating the fiber.

15. A dilute aqueous alkaline solution of a fungicidally active fusible resin formed by fusing a permanently fusible phenol-aldehyde resin in major quantity with a lesser quantity of a polychlorinated carbocyclic compound, containing at least 3 chlorine atoms, selected from the group consisting of polychlorinated carbocyclic hydrocarbons and polychlorinated carbocyclic hydrocarbon alkoxy ethers, said compound containing substituted chlorine which is evolved as hydrogen chloride by heating said compound with said resin, said resin being formed at a temperature exceeding the melting point of said resin.

16. A dilute aqueous alkaline solution of a fungicidally active fusible resin product formed by fusing a permanently fusible phenol-aldehyde resin in major quantity with a lesser quantity of a polychlorinated carbocyclic compound, containing at least 3 chlorine atoms, selected from the group consisting of polychlorinated carbocyclic hydrocarbons and polychlorinated carbocyclic hydrocarbon alkoxy ethers, said compound containing substituted chlorine which is evolved as hydrogen chloride by heating said compound with said resin, said resin being formed at a temperature exceeding the melting point of said resin and being reacted with a compound selected from the group consisting of phenol and cresol, each having 1 to 5 carbon atoms substituted in the ring, to form said product.

References Cited in the file of this patent

UNITED STATES PATENTS

| | | |
|---|---|---|
| Re. 13,531 | Aylsworth | Feb. 11, 1913 |
| 2,621,163 | Coash | Dec. 9, 1952 |

FOREIGN PATENTS

| | | |
|---|---|---|
| 592,670 | Great Britain | Sept. 25, 1947 |